US007376656B2

(12) United States Patent
Blakeley et al.

(10) Patent No.: US 7,376,656 B2
(45) Date of Patent: May 20, 2008

(54) SYSTEM AND METHOD FOR PROVIDING USER DEFINED AGGREGATES IN A DATABASE SYSTEM

(75) Inventors: Jose A. Blakeley, Redmond, WA (US); Hongang Zhang, Bellevue, WA (US); Balaji Rathakrishnan, Sammamish, WA (US); Ramachandran Venkatesh, Bellevue, WA (US); Beysim Sezgin, Redmond, WA (US); Alexios Boukouvalas, Seattle, WA (US); Cesar A. Galindo-Legaria, Redmond, WA (US); Peter A. Carlin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 10/775,982

(22) Filed: Feb. 10, 2004

(65) Prior Publication Data

US 2005/0177579 A1   Aug. 11, 2005

(51) Int. Cl.
  *G06F 7/00* (2006.01)
  *G07F 17/00* (2006.01)
(52) U.S. Cl. .................. 707/100; 707/103 R; 717/108; 717/165
(58) Field of Classification Search ................ 707/100, 707/103 R; 717/108, 165
  See application file for complete search history.

(56) References Cited

U.S. PATENT DOCUMENTS

| 5,297,279 A | * | 3/1994 | Bannon et al. | ......... 707/103 R |
| 5,437,027 A | * | 7/1995 | Bannon et al. | ......... 707/103 R |
| 5,696,961 A | | 12/1997 | Briscoe et al. | |
| 5,826,077 A | | 10/1998 | Blakeley et al. | |
| 5,864,862 A | * | 1/1999 | Kriens et al. | ........... 707/103 R |
| 5,884,317 A | * | 3/1999 | Cline et al. | ............. 707/103 R |
| 5,900,870 A | | 5/1999 | Malone et al. | .............. 715/866 |
| 6,047,291 A | | 4/2000 | Anderson et al. | ........... 707/103 |
| 6,070,174 A | | 5/2000 | Starek et al. | ................ 707/206 |
| 6,108,004 A | | 8/2000 | Medl | .......................... 715/804 |
| 6,112,024 A | | 8/2000 | Almond et al. | ............. 717/122 |

(Continued)

OTHER PUBLICATIONS

"A data preparation framework based on a multidatabase language", by Sattler K.U. and Schallehn E., Database Engineering & Applications, 2001 International Symposium, Jul. 16-18, 2001, pp. 219-228.*

(Continued)

*Primary Examiner*—Tim Vo
*Assistant Examiner*—Jay A Morrison
(74) *Attorney, Agent, or Firm*—Woodcock Washburn LLP

(57) ABSTRACT

A database system and method allows a user to write program code in a high-level programming language that implements a class that defines the structure of a user-defined aggregate and methods that can be invoked on instances of the user-defined aggregate. The class is then registered with the database system, which enforces a specific contract for user-defined aggregates against the class. The contract comprises the following requirements. First, the class must specify one of a plurality of different formats for persisting instances of the user-defined aggregate in a database store. Second, the class must comprise certain specified methods that can be invoked on an instance of the class. Once these requirements are satisfied, the database system enables instances of the user-defined aggregate to be created. Preferably, the database system stores metadata about the user-defined aggregate for subsequent use in creating instances of the aggregate.

23 Claims, 8 Drawing Sheets

U.S. PATENT DOCUMENTS

| | | | |
|---|---|---|---|
| 6,199,100 B1 | 3/2001 | Filepp et al. | 709/203 |
| 6,199,195 B1 | 3/2001 | Goodwin et al. | 717/104 |
| 6,223,344 B1 | 4/2001 | Gerard et al. | 717/170 |
| 6,338,056 B1 | 1/2002 | Dessloch et al. | 707/2 |
| 6,370,541 B1 | 4/2002 | Chou et al. | 707/103 |
| 6,505,211 B1 | 1/2003 | Dessloch et al. | 707/103 Y |
| 6,519,597 B1 | 2/2003 | Cheng et al. | 707/10 |
| 6,556,983 B1 | 4/2003 | Altschuler et al. | 706/55 |
| 6,564,205 B2* | 5/2003 | Iwata et al. | 707/2 |
| 6,578,046 B2 | 6/2003 | Chang et al. | 707/4 |
| 6,671,687 B1 | 12/2003 | Pederson et al. | 707/9 |
| 6,708,186 B1* | 3/2004 | Claborn et al. | 707/102 |
| 6,708,196 B1 | 3/2004 | Atkinson et al. | 718/102 |
| 6,772,178 B2 | 8/2004 | Mandal et al. | 707/204 |
| 6,785,690 B1 | 8/2004 | Davidson | 707/103 Y |
| 6,850,893 B2* | 2/2005 | Lipkin et al. | 705/8 |
| 6,968,538 B2* | 11/2005 | Rust et al. | 717/108 |
| 2002/0091702 A1 | 7/2002 | Mullins | 707/100 |
| 2002/0152422 A1 | 10/2002 | Sharma et al. | 714/13 |
| 2002/0198891 A1 | 12/2002 | Li et al. | 707/102 |
| 2003/0167277 A1* | 9/2003 | Hejlsberg et al. | 707/102 |
| 2005/0125401 A1* | 6/2005 | Carr et al. | 707/5 |

OTHER PUBLICATIONS

"An overview of three commercial object-oriented database management systems: ONTOS, ObjectStore, and O2", by Valery Soloviev, Mar. 1992, ACM SIGMOD Record, vol. 21 Issue 1, pp. 93-104, Publisher: ACM Press.*

"Advanced Grouping and Aggregation for Data Integration", by Schellehn, E., Kai-Uwe, S., and Saake, G., Conference on Information and Knowledge Management archive, Proceedings of the tenth international conference on Information and knowledge management, Atlanta, Georgia, USA, pp. 547-549, Year: 2001, ISBN:1-58113-436-3.*

"Solving the modeling problems of object-oriented languages by composing multiple aspects using composition filters", M Aksit, B Tekinerdogan, OOPSLA AOP'98 workshop position paper, 1998, pp. 1-7.*

"Solving the Java object storage problem", by Douglas Barry and Torsten Stanienda, Computer, vol. 31, Issue 11, Nov. 1998, pp. 33-40, IEEE.*

Andrews, T. et al., "Combining Language and Database Advances in an Object-Oriented Development Environment", *OOPSLA Proceedings*, Oct. 4-8, 1987, 430-440.

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistence in Database Programming Languages", *ACM*, 1986, 4-15.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Varlamis, I. et al., "Bridging XML-Schema and Relational Databases. A System for Generating and Manipulating Relational Databases Using Valid XML Documents", *DocEng 'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

Findler, R.B. et al., "Contract Soundness for Object-Oriented Languages" *ACM Conference on Object-Oriented Programming Systems, Languages, and Applications, OOPSLA*, 2001, 15 pages.

Harrison, C.J. et al., Structure Editors: User-Defined Type Values and Type Inference, *IEEE*, 2000, 241-247.

Michael Stonebraker, "Inclusion of New Types in Relational Data Base Systems", *IEEE International Conference on Data Engineering*, 1986, 1-19.

Berg, C., "How Do I Create Persistent Java Objects?", *Dr. Dobb's Journal*, 1997, 22(4), 98-101.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serializatin in Java 1.1. Making Objects Persistent", *Web Techniques*, 1997, 2(9), 55, 58-59.

Frost., "Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, Abstract Only, 2 pages.

Haverlock, K., "Object Serialization, Java, and C++", *Dr. Dobbs. Journal*, 1998, 23(8), 32, 34, 36-37.

King, et al., "TriStarp-An Investigation into the Implementation and Exploitation of Binary Relational Storage Structures", *Proc. 8 Supppl BNCOD(British National Conference on Data Bases)*, 1990, 64-84.

In the United States Patent and Trademark Office, In Re: U.S. Appl. No. 11/057,475, filed Feb. 14, 2005, Non-final Office Action dated Oct. 16, 2007, 14 pages.

* cited by examiner

```
using System.Data.SqlTypes;
using System;
using System.Text;

[UdAgg]
[Serializable]
[SqlUdAgg(
        Format.SerializedDataWithMetadata,
        IsInvariantToNulls=true,
        IsInvariantToDuplicates=false, IsInvariantToOrder=true,
        MaxByteSize=8000)
]
public class Concat
{
        private StringBuilder result;

public void Init( )
        {
                result = new StringBuilder();
        } public void Accumulate(SqlString nextval)
        { if(nextval.IsNull)
                {
                        return;
                }
                result.Append(nextval.Value);

} public void Merge( Concat otheragg)
        {
                result.Append(otheragg.result);
        } public SqlString Terminate()
        { return new SqlString(result.ToString());
        }
}
```

Figure 2A

```
using System.Data.SqlTypes;
using System;
using System.Text;

[Serializable]
[SqlUdAgg(
        Format.SerializedDataWithMetadata,
        IsInvariantToNulls=true,
        IsInvariantToDuplicates=false,
        IsInvariantToOrder=false,
        MaxByteSize=8000)
]
public struct SumOfSquares
{ public int result;

public void Init()
        {
                result = 0;
        } public void Accumulate(SqlInt32 next)
        {
                if (next.IsNull)
                        return;
                result += (next.Value * next.Value);
        } public void Merge(SumOfSquares other)
        {
                result += other.result;
        } public SqlInt32 Terminate()
        {
                return new SqlInt32(result);
        }
}
```

Figure 2B

| Column Name | Data Type | Description |
|---|---|---|
| object_id | int | Object identification number of the SQL object, unique within a database. |
| assembly_id | int | Id of assembly from which this module was created. |
| assembly_class | sysname | Name of class within assembly which defines this module. |
| assembly_method | sysname | Name of method within the assembly_class which defines this module. Will be NULL for Aggregate Functions (AF). |
| null_on_null_input | bit | Module was declared to produce a NULL output on any NULL input. |
| execute_as_principal_id | int | ID of the "EXECUTE AS" database principal.<br>o NULL by default or if EXECUTE AS CALLER.<br>o Id of the specified principal if EXECUTE AS SELF EXECUTE AS <principal>.<br>o -2 if EXECUTE AS OWNER. |

Figure 5

SYSTEM AND METHOD FOR PROVIDING USER DEFINED AGGREGATES IN A DATABASE SYSTEM

CROSS-REFERENCE TO RELATED APPLICATIONS

The subject matter of this application is related the subject matter of, commonly assigned, patent application Ser. No. 10/775,282, filed concurrently, entitled "System and Method for Providing User-Defined Types in a Database System," now U.S. Pat. No. 6,976,029.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to data storage in a computer system, and more particularly, to a system and method for providing user-defined aggregates in a database system.

BACKGROUND

Database management systems exist today that provide database developers with the ability to write program code that can be executed within the database environment by, for example, a runtime component integrated within the database environment. For example, MICROSOFT SQL SERVER is a comprehensive database management platform that provides extensive management and development tools, a powerful extraction, transformation, and loading (ETL) tool, business intelligence and analysis services, and other capabilities. Among other improvements, the MICROSOFT WINDOWS .NET Framework Common Language Runtime (CLR), a runtime environment, recently has been integrated into the SQL SERVER database.

The CLR is the heart of the MICROSOFT .NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at structural data access and management, it is not a full-fledged programming language as are VISUAL BASIC .NET and C#. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both VISUAL BASIC .NET and C# are modern programming languages offering full support for arrays, structured exception handling, and collections. Developers can leverage CLR integration to write code that has more complex logic and is more suited for computation tasks using languages such as VISUAL BASIC .NET and C#. These programming languages offer object-oriented capabilities such as encapsulation, inheritance and polymorphism. Related code can be easily organized into classes and namespaces.

Managed code is better suited than Transact-SQL for number crunching and complicated execution logic, and features extensive support for many complex tasks, including string handling and regular expressions. With the functionality found in the .NET Framework Base Class Library (BCL), database developers have access to thousands of pre-built classes and routines which can be easily accessed from any stored procedure, trigger or user defined function.

Another benefit of managed code is type safety. Before managed code is executed, the CLR verifies that the code is safe. This process is known as "verification." During verification, the CLR performs several checks to ensure that the code is safe to run. For example, the code is checked to ensure that no memory is read that has not be been written to. The CLR will also prevent buffer overflows.

When writing managed code, the deployment unit is called an assembly. An assembly is packaged as a dynamic link library (DLL). Managed DLL assemblies can be loaded into and hosted by SQL SERVER. The CREATE ASSEMBLY statement is used to register an assembly in the server. Here is an example:

```
CREATE ASSEMBLY YukonCLR
  FROM 'C:\MyDBApp\YukonCLR.dll'
```

The FROM clause specifies the pathname of the assembly to load.

Traditionally, database management systems, such as SQL SERVER, have supported built-in aggregate functions defined by the structured query language (SQL), such as COUNT, SUM, MAX, MIN, and AVG, that operate on a set of input scalar values and generate a single aggregate value from that set. Typically, in these systems, the only option users have to program the computation of an aggregate function is to write a stored procedure that creates a cursor over a set of rows and computes the aggregate function by iterating over groups of rows in that cursor. It would be desirable if users could create their own custom aggregate functions that would operate, from the standpoint of a user, as any of the built-in aggregate functions. The present invention provides such a capability.

SUMMARY

The present invention is directed to a system and method that allows a user to define new aggregate functions that operate, from the standpoint of a user, as any built-in aggregate function. According to the invention, a user writes program code in a high-level programming language that implements a class that defines the structure of a user-defined aggregate and methods that can be invoked on instances of the user-defined aggregate. The class is then registered with the database system, which enforces a specific contract for user-defined aggregates against the class. The term "contract," as used herein and in the claims, refers to a technique that is used at runtime in object-oriented programming environments to check that code to be executed satisfies certain pre-conditions or requirements to ensure that it will execute properly. According to the present invention, the contract against which a class that defines a user-defined aggregate is compared requires that the class implement the following types of methods: (1) a method that can be invoked to initialize the computation of an instance of the user-defined aggregate; (2) a method that can be invoked to accumulate a plurality of values to be aggregated with the user-defined aggregate; and (3) a method that can be invoked to compute a final result of an instance of the user-defined aggregate. In one embodiment, the contract further requires the class to implement a method that can be invoked to merge an instance of the user defined aggregate with another partial aggregation. The contract may also require (i) that the class specify one of a plurality of different formats for persisting instances of the user-defined aggregate in a database store, and/or (ii) that the class implement a public constructor having no arguments. Once these requirements are satisfied, the database system enables the user-defined aggregate to be used in queries like any of the built-in aggregate functions provided by the database system. The database system may store metadata describing the structure of a user-defined aggregate for subsequent use in processing queries that reference a user-defined aggregate.

In one embodiment, the plurality of different formats for persisting instances of the user-defined aggregate comprises a first format in which an instance of the user-defined aggregate is automatically serialized in accordance with a native format of the database system, and a second format in which an instance of the user-defined aggregate is serialized in a manner defined by the user authored class. Additionally, when the present invention is embodied within MICROSOFT SQL SERVER, in which the MICROSOFT .NET CLR is integrated, a third format is available in which an instance of the user-defined aggregate is serialized in accordance with a method provided by the MICROSOFT .NET Framework.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 2A is a program code listing of an exemplary class definition for a user-defined aggregate, in accordance with one embodiment of the present invention;

FIG. 2B is a program code listing of another exemplary class definition for a user-defined aggregate, in accordance with one embodiment of the present invention;

FIG. 5 is a table illustrating certain metadata stored in a database system catalog, in accordance with an embodiment of the present invention;

DETAILED DESCRIPTION OF THE INVENTION

Figure 1:
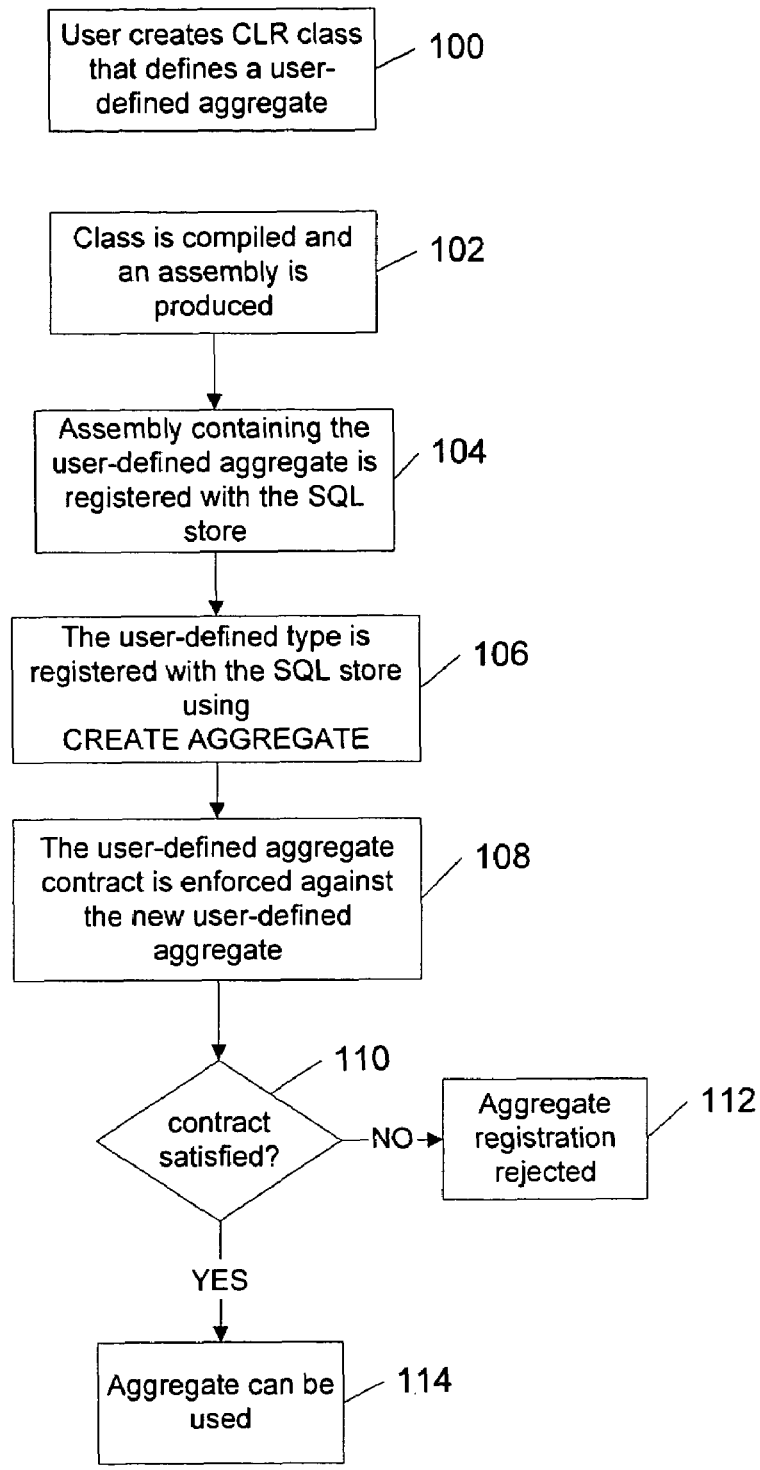
FIG. 1 is a flow diagram illustrating one aspect of a method of the present invention, in accordance with one embodiment thereof.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The above Summary provides an overview of the features of the invention. A detailed description of one embodiment of the invention follows. In the embodiment described below, the foregoing features of the present invention are described as implemented in the MICROSOFT SQL SERVER database system. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Creating a User-Defined Aggregate

As stated above, according to the invention, a user writes program code in a high-level programming language that implements a class that defines the structure (e.g., the fields or properties of the class) of a user-defined aggregate and the methods that can be invoked on instances of the aggregate. In the present embodiment, the class may be written in a high-level programming language supported by the MICROSOFT .NET CLR, such as MICROSOFT VISUAL BASIC .NET or C#. In the present embodiment, the class file is annotated with a custom attribute called SqlUdAgg() to identify it as a class definition for a user-defined aggregate.

In the present embodiment, the SqlUdAgg() attribute comprises the following properties:

Format—this is the storage format of the user-defined aggregate, described more fully below; and MaxByteSize—this is the maximum size in bytes that will be needed to store the state for this aggregate during computation. In the present embodiment, the maximum allowed value is 8000 bytes.

In other embodiments, there may be fewer or more properties included in the SqlUdAgg() attribute.

Further according to the present invention, the class that defines a user-defined aggregate must meet the requirements of a specific contract. The contract is enforced against the class when the user attempts to register the class with the database system. The term "contract," as used herein and in the claims, refers to a technique that is used at runtime in object-oriented programming environments to check that code to be executed satisfies certain pre-conditions or requirements to ensure that it will execute properly. According to the present embodiment, the contract against which a class that defines a user-defined aggregate is compared requires that the class defining the user-defined aggregate comprise a set of methods that can be invoked by a query processor of the database system to initialize the computation of an instance of the user-defined aggregate, to accumulate input values into the function provided by the user-defined aggregate, and to retrieve the aggregate value. In the present embodiment, this set of methods comprises the following three methods.

The first is a method that can be invoked to initialize the computation of an instance of the user-defined aggregate. In the present embodiment, this method has the following signature:

public void Init();

The query processor will use this method to initialize the computation of the aggregation. In the present embodiment, this method will be invoked once for each group that the query processor is aggregating. Preferably, the query processor may choose to reuse the same instance of the aggregate class for computing aggregates of multiple groups. In the present embodiment, the Init() method should perform any clean-up as necessary from previous uses of this instance and bring it to a state where it can be used to re-start a new aggregate computation.

The second is a method that can be invoked to accumulate a plurality of values to be aggregated with the user-defined aggregate. In the present embodiment, this method has the following signature:

public void Accumulate (input-type);

The input_type argument should be a data type provided by the database system. The query processor will invoke this method to accumulate the aggregate values in accordance with its function. In the present embodiment, this method will be invoked once for each value in the group that is being aggregated, and the query processor will call this method after performing an Init on the given instance of the user-defined aggregate class. In the present embodiment, the implementation of this method by the class author should update the state of the instance to reflect the accumulation of the argument value being passed into the method.

The third is a method that can be invoked to compute a final result of an instance of the user-defined aggregate. In the present embodiment, this method has the following signature:

public return_type Terminate();

This method completes the aggregate computation and returns the result of the aggregation. In the present embodiment, the return_type should be a data type provided by the database system.

In the present embodiment, the contract may further require that the class implement a fourth method that can be invoked to merge another instance of the user-defined aggregate with a current instance. In the present embodiment, this method has the following signature:

public void Merge(udagg_class);

The udagg_class argument is a reference to the other instance that is to be merged into the current instance. In the present embodiment, the query processor may use this method to merge multiple partial computations of an aggregation on partitions of a group.

In the present embodiment, the contract may also require that the class specify one of a plurality of different formats for persisting (i.e., storing) instances of the user-defined aggregate in a database store, i.e., the format that the SQL engine will use to store instances of the user-defined aggregate on disk. A query processor of the database system may use serialization when it needs to persist temporary results of an aggregation into work-tables. As mentioned above, in the present embodiment, the persistence format (sometimes also referred to as the "storage format") is specified using the Format property of the SqlUdAgg() custom attribute. The following storage formats are available to the class author:

Format=Native. When this format is specified, the SQL Server engine will use an efficient native representation on disk. In the present embodiment, this is the most compact and efficient format option. Also in the present embodiment, additional requirements for specifying this format are (i) that the class has to also be annotated with a StructLayout.LayoutKindSequential custom attribute, (ii) all the fields of the user-defined aggregate should be blittable, (iii) the type should not specify a value for MaxByteSize, (iv) the type should not have any [NonSerialized] fields, and (v) no field should be marked as an explicit layout. A "blittable" type is a type that has a common representation in both managed and unmanaged memory. Such types do not require conversion when passed between managed and unmanaged code.

Format=UserDefined. When this format is specified, the class author must provide code for handling the storage of instances of the user-defined aggregate. This gives full control over the binary format to the user. In the present embodiment, additional requirements for specifying this format are (i) the class must implement the IBinarySerialize interface, and (ii) the class must specify a value for the MaxByteSize property.

Format=SerializedDataWithMetadata. This format stores instances of the user-defined aggregate in accordance with the serialization options provided by the MICROSOFT .NET Framework. Also, with this format, serialization metadata is stored along with each instance of the type. In the present embodiment, additional requirements for specifying this format are (i) the class should be annotated with the [Serializable] attribute, and (ii) the class must specify a value for MaxByteSize.

Finally, in one embodiment, the contract may also require a class defining a user-defined aggregate to contain a public constructor having no arguments.

FIG. 1 is flow diagram illustrating one embodiment of a method for registering a user-defined aggregate with a database system, such as, in the present embodiment, the MICROSOFT SQL SERVER database system. As shown at step 100, the process begins with a user creating a CLR class definition for a new user-defined aggregate. As mentioned above, the class must be annotated with the SqlUdAgg() custom attribute and it must satisfy the requirements of the contract for user-defined aggregates in accordance with the present invention.

FIG. 2A is an exemplary code listing in the C# programming language for a class that defines a user-defined aggregate function called "Concat." This aggregate function concatenates a set of input string values within one or more groups. The groups are defined by the set of rows that share a common value specified in the set of expressions listed in a GROUP BY clause of a SQL statement. For example, consider the following SQL query:

```
SELECT Department, Concat (email) FROM Employees
WHERE Location = 'Seattle'
GROUP BY Department
```

In this example, all Employees sharing the same value in the Department column of the Employee row will be grouped together. The Concat function will be applied to each row in the group to compute an email list for the employees in the same department.

FIG. 2B is an exemplary code listing in the C# programming language for a class that defines a user-defined aggregate function called "SumOfSquares" which calculates the sum of the squares of a sequence of input values of type SqlInt32. As shown in both examples, the class definition for each user-defined aggregate includes the SqlUdAgg() custom attribute and the Init(), Accumulate(), Merge(), and Terminate() methods required by the contract for user-defined aggregates.

Referring again to FIG. 1, once the program code for the class has been created, the class is compiled and an assembly is produced at step 102. Next, at step 104, the assembly containing the user-defined aggregate is registered with the SQL Server store using a CREATE ASSEMBLY DDL statement. At step 106, in accordance with the present embodiment, the user-defined aggregate is registered with the SQL SERVER database using a CREATE AGGREGATE statement. In the present embodiment, the CREATE AGGREGATE statement has the following syntax:

```
CREATE AGGREGATE [schema-name.]aggregate_name
    ( @param_name input_sqltype )
RETURNS return_sqltype
EXTERNAL NAME assembly_name[:class_name]
```

The class_name is the name of the class, and the assembly_name is the name of the assembly that contains the class. The aggregate_name is the name that users will use to invoke the aggregate function within a SQL query. Like tables, procedures, functions and types, user-defined aggregates may be defined within a specific schema in a database. Schemas serve as name spaces that organize objects registered inside the database. The schema-name is the name space within a SQL database where the user-defined aggregate is registered. The input_sqltype and return_sqltype are the equivalents of the data types used in the Accumulate() and Terminate() methods of the class, respectively. The @param_name is the name given to the argument that is to be passed into the aggregate function. By way of example, assuming that the C# code of FIG. 2A is compiled into an assembly named concat-udagg.dll, the following could be used to register the user defined aggregate Concat with SQL SERVER:

```
CREATE AGGREGATE Concat (@instr nvarchar(400))
RETURNS nvarchar (MAX)
EXTERNAL NAME [concat-udagg]:Concat
```

Referring back to FIG. 1, during type creation, as shown at step 108, the system ensures the user-defined aggregate contract is fully implemented by the class implementing the aggregate. If the contract is satisfied, then as shown at step 114, a user-defined aggregate is created over the managed code class. As part of the aggregate creation and validation process, the facets (fields and methods) of the user-defined aggregate are validated and information is imported into the database system catalog that describes the structure of the user-defined aggregate and its methods. Once this process is complete, the user-defined aggregate is registered and can be used in queries. If the user-defined aggregate contract is violated, then as shown at step 112, the attempt to register the user-defined aggregate will be rejected and an error will reported to the user.

Properties for Query Optimization

In accordance with one embodiment of the present invention, additional properties of a user-defined aggregate can be specified in its class definition and used by a query processor to optimize computation of the aggregate function. That is, these properties can be used by a query optimizer to search for alternative, more efficient query execution plans. In the present embodiment, these properties can be specified as part of the SqlUdAgg() custom attribute in the program code that implements the class that defines the user-defined aggregate. In the present embodiment, the following additional properties may be specified:

IsInvariantToDuplicates—This property, if set to true, indicates whether the user-defined aggregate is invariant to duplicates, i.e., whether AGG(S+{X})=S when X in S. Built-in aggregates, such as MIN and MAX, satisfy this condition, whereas a built-in aggregate, such as SUM, does not. In the present embodiment, the default value is FALSE, i.e. an aggregate cannot be assumed to be invariant to duplicates. The SQL language provides explicit control over duplicates. For example, one may extract the (Country, City) columns out of an EMPLOYEE table. One may want the result to contain as many rows as those in the EMPLOYEE table, or only the distinct values for (Country, City). When an aggregate is known to be invariant to duplicates, the computation delivering the data to the aggregate can be modified by either discarding or introducing new duplication-removal operations. Duplication-removal does take processing time, so in some cases it is more efficient not to do it; on the other hand, duplication-removal may reduce the number of rows processed by later operations and shorten execution time. In accordance with the present invention, a query optimizer can use the IsInvariantToDuplicates property to determine the best strategy and will have the freedom to introduce or remove this operation when the IsInvariantToDuplicates property is set to "true."

IsInvariantToNulls—This property, if set to true, indicates whether the aggregate is invariant to NULLs, i.e., whether AGG(S+{NULL})=AGG(S). Built-in aggregates, such as MIN and SUM satisfy this condition, whereas an aggregate, such as COUNT, does not. In the present embodiment, the default value for the IsInvariantToNulls property is "false." If an aggregate is invariant to NULLs, then NULL rows can be discarded from the input in some cases, but care must be taken not to discard entire groups. For example, if an aggregate is performed on the result of an outerjoin operation, NULL rows can be filtered before they are processed by the outerjoin. The query processor can respond to the IsInvariantToNulls property in this manner to optimize a query if appropriate.

IsInvariantToOrder—This property, when set to true, indicates whether the aggregate is invariant to order. If a user-defined aggregate is invariant to order, a query optimizer has more flexibility in choosing execution plans for queries that include the aggregate. In the present embodiment, the default value for the IsInvariantToOrder property is "false." A query specification can request that the aggregate process it's input in a specified order. However, when the IsInvariantToOrder property of a user-defined aggregate is true, then the Query Processor can ignore the order request and potentially avoid having to sort the data.

IsNullIfEmpty—This property, when set to true, indicates whether the aggregate returns NULL if the group is empty, i.e. if no values have been accumulated. In the present embodiment, the default value for this property is "false." The following example describes what the optimizer can consider based on the IsNullIfEmpty property. It is important to note that with all the foregoing properties, what the properties do is allow more alternatives for the execution of a query. Depending on the actual data and the predicates, those new alternatives may or may not be better, and it is the task of the optimizer to choose one of them based on the estimated execution cost. In other words, the aggregate properties do not necessarily dictate a different way to process the query, but give the optimizer more freedom in choosing a plan.

With respect to the IsNullIfEmpty property, for example, suppose that the following query is generated to the query processor, and that it includes a user-defined aggregate ("Agg") that operates on a set of rows, R, in table T.

```
SELECT T. *
FROM T
WHERE T.a >
    (SELECT Agg(R.b)
    FROM R
    WHERE R.c = T.c)
```

If R is an empty set, then the query processor will be performing the aggregate on an empty set. However, if the query processor knows from the IsNullIfEmpty property of the user-defined aggregate, that the aggregate returns a NULL value if a group is empty, then the query can be rewritten by the query processor to be more efficiently executed as follows:

```
SELECT T. *
FROM T left outer join
    (SELECT c, Agg(r.b) a
    FROM R
    GROUP by R.c) V on V.c = T.c
WHERE T.a > V.a
```

The resulting query can then be simplified further according to known techniques. For example, since the predicate T.a>V.a will reject rows with NULL values in V.a, the outer join can be simplified to inner join.

In the present embodiment, there are two important aspects to the framework for expressing these optimization properties. First, every property has a default value. This allows new properties to be created in the future, without requiring a rewrite of existing user-defined aggregates classes. Second, every property is defined such that the default value is always safe, in the sense that the optimizer considers only conservative plans unless specifically told that the aggregate has specific behavior that can be exploited.

Invoking a User-Defined Aggregate

In the present embodiment, user-defined aggregates can be invoked in SELECT lists and are subject to the same rules as system aggregate functions. For example, the user-defined aggregate, Concat, defined in the code sample shown in FIG. 2A, concatenates a set of strings within a group. This aggregate function could be used to compute an email list for a set of people in the same department, using a query such as the following:

```
SELECT Department, CONCAT(email) FROM Employees
WHERE Location = 'Seattle'
GROUP BY Department
```

In the present embodiment, when a query involving a user-defined aggregate is compiled, the database system generates four expressions (from the methods in the class definition) that the query processor will call at various points during the execution of the aggregate: initialization, accumulation, merge, and terminate. In the present embodiment, each of these compiled expressions will be encapsulated as a function implemented by a sequence of .NET Intermediate Language (IL) instructions. The IL instructions generated implement a custom marshalling mechanism for input arguments and return values. The instructions also include the appropriate method invocations necessary to carry out the aggregation.

Figure 3:
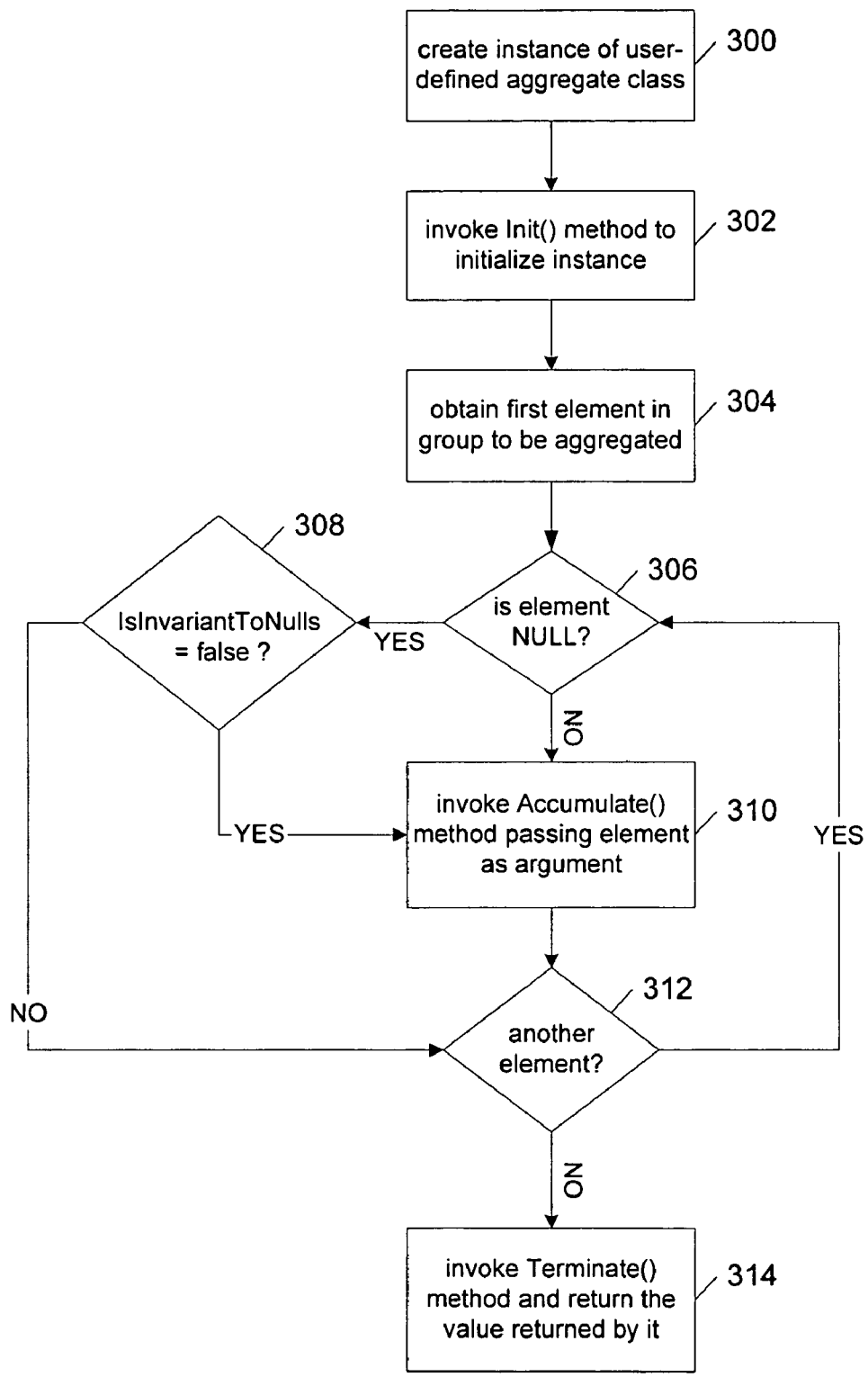
FIG. 3 is a flow diagram illustrating further aspects of one embodiment of a method of the present invention.

FIG. 3 is a flow diagram illustrating the logical steps performed by the query processor of a database system in performing the aggregation for a group on which the user-defined aggregate is being computed, in accordance with one embodiment of the present invention. As shown, at step 300, the query processor first creates an instance (e.g., x) of the user-defined aggregate class, if necessary. The query processor may also choose to reuse an instance from the computation of a previous group. Next, at step 302, the query processor invokes the initialization method (e.g., x.Init()) to initialize the instance for a fresh computation of the aggregate. Then, the first element (i.e. row) in the group to be aggregated is obtained (step 304) and a determination is made at step 306 as to whether the element is NULL. If the element is not NULL, then at step 310, the Accumulate() method is invoked passing the element as the argument. Control then passes to step 312.

If at step 306, it is determined that the element is NULL, then the query processor determines at step 308 whether the IsInvariantToNulls property of the SqlUdAgg() custom attribute is set to false. If so, then control passes to step 310 where the Accumulate() method is invoked passing the element as an argument. If the IsInvariantToNulls property is set to true, then control passes to step 312.

At step 312, a determination is made as to whether there are any other elements of the group to be aggregated. If so, then control passes back to step 306 where steps 306-310 are repeated for the next element. These steps will be repeated until all of the elements of the group have been processed. Once all of the elements of the group have been processed, then at step 314 the query processor calls the Terminate() method and returns the value returned by the Terminate() method as the return value for the aggregate function.

As mentioned above, in the present embodiment, the query processor may also invoke the Merge() method of an instance of a user-defined aggregate. Merge may be used whenever a final aggregate result is based on computing the aggregate on subsets of data. For example, the Merge() method can be used in parallel query processing, where data is partitioned and provided to different processors to compute an aggregate in parallel. At the end of such parallel processing, the Merge() method is invoked to combine the results of the partial aggregations.

The Merge() method can also be invoked when combining data from multiple sources. For example, data can be gathered from multiple servers and it may be desirable to compute an aggregate result at the end. Instead of getting all the data to a central site and only then computing the aggregate, the aggregate evaluation can be done separately at each server, and then the results can be combined using the Merge() method. This is an example of splitting an aggregation into a "local aggregation" followed by "global or final aggregation."

Another example is moving the "local aggregation" below a UNION ALL operation. In some cases, it is possible and effective to move the "local aggregation" below other operations such as JOIN or OUTERJOIN. In such case, the goal is to reduce the data volume to process and therefore provide improved execution time. The Merge() method is needed to do the global aggregation.

Additionally, in cases where main memory is limited, the Merge() method can be used to make the aggregate computation more efficient. For example, a stream of rows can be read and computing of aggregates started. When main memory is exhausted, some of these aggregates (which are only partially computed) can be sent to disk, freeing up space to receive more rows. In the end, the results of the partial aggregations sent to disk will need to be combined together through a global aggregation for the final result. Again, the Merge() method can be used for this global aggregation.

Figure 4:
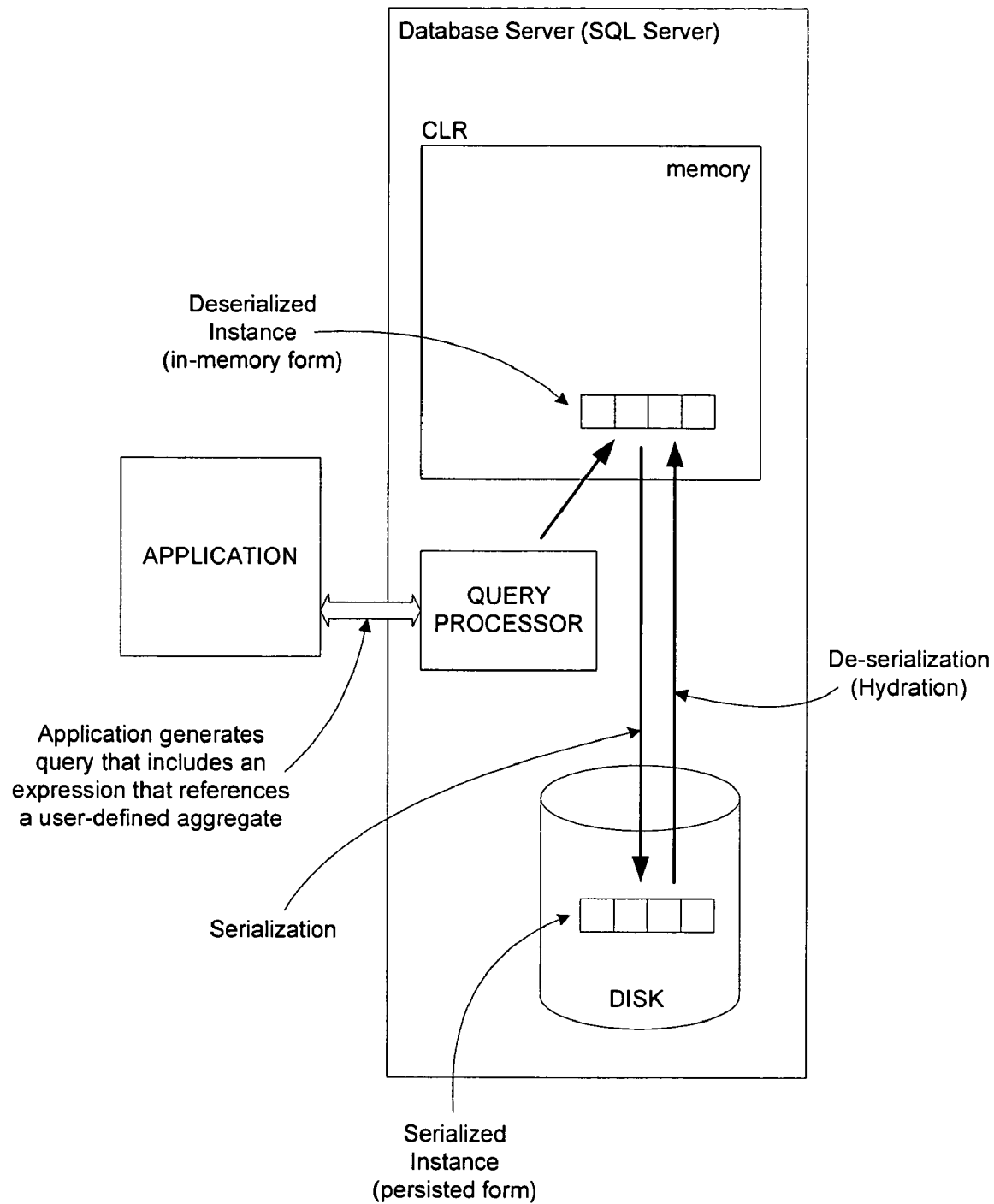
FIG. 4 is a block diagram illustrating the serialization and deserialization of an instance of a user-defined aggregate that has been instantiated in managed code.

FIG. 4 illustrates the serialization and deserialization of an instance of a user-defined aggregate. As mentioned above, a query processor of the database system may use serialization when it needs to persist temporary results of an aggregation into work-tables. As illustrated in FIG. 4, when an application or user of the database system generates a query to the database system that includes an expression that references a user-defined aggregate, the query processor will create an instance of the user-defined aggregate class in CLR memory to hold the state of the aggregation (or the query processor will re-use an existing instance). If the query processor needs to persist temporary results of an aggregation to disk, the in-memory instance will be serialized to disk in accordance with the storage format specified by the format property of the SqlUdAgg() custom attribute in the class definition for the aggregate. When ready to continue computation, the instance will be deserialized back into an in-memory instance.

Because serialization and deserialization of an instance of a user-defined aggregate can be time consuming, this process can have an impact on processing time. For example, in the case of an aggregation that requires serialization to store temporary results of an aggregation, when computing an aggregate over a group of rows, the instance of the user-defined aggregate must be deserialized each time the Accumulate() method is invoked on a given row of the group. That is, for each row of the group, the query processor must deserialize the serialized form into an in-memory instance, invoke the Accumulate() method, and then serialize the instance to disk. In the present embodiment, this is accomplished by a series of IL instruction having the following pseudo-code form:

push input argument
    push binary state of aggregate on runtime stack
    deserialize instance of aggregate
    invoke Accumulate()
    serialize instance of aggregate
    return binary state of aggregate Having to execute this series of instruction for each row of a large group is very time consuming, as the deserialize and serialize operations take a significant amount of time. According to another aspect of the present invention, to overcome the inefficiencies that might otherwise result in such a scenario, the query processor caches the instance of the user-defined aggregate in memory rather than deserializing/serializing the instance for each row of a group. The cached instance is then used across the rows of the group, and the instance need only be deserialized once. This results in a significant optimization.

Metadata

As mentioned above, in the present embodiment, as part of the user-defined aggregate creation and validation process, information in the form of metadata is imported into the database system catalog that describes the structure of the aggregate and its methods. FIG. 5 illustrates the column headings of a table of the database system catalog in which metadata information for each user-defined aggregate contained in a CLR assembly is stored. Each row of this table stores metadata about one user-defined aggregate or other object registered with the database. User-defined aggregates are identified in the table with an "AF" designation. The information stored for each aggregate includes an "object_id" that uniquely identifies the aggregate, and an identification (assembly_id) of the assembly from which the aggregate was created. The "assembly_class" identifies the name of the class within the assembly that defines the aggregate.

Modifications to Existing Database System

In some embodiments, in order to accommodate the user-defined aggregate capabilities of the present invention, it may be desirable to make the following types of modifications to the existing database management system. First, the query optimizer may need to be modified to recognize user-defined aggregates and the optimization properties discussed above, which may be specified for them. Second, whereas with built-in aggregates, the DISTINCT modifier for aggregate functions can be treated as part of the aggregate, so that, for example, one can consider one aggregate to be SUM and another SUM DISTINCT, with user-defined aggregates it is necessary to treat the DISTINCT modifier separate from the aggregation function. Third, in query execution, it may be necessary to change the algorithms that do grouping and aggregation (typically, stream aggregation, hash aggregation and index aggregation) to call the four methods of the user-defined aggregate class, instead of hard coded functions for the standard SQL aggregations. Finally, it may be desirable for internal representations of user-defined aggregates to be similar to that of existing built-in aggregate functions so that other code can interact with the user-defined aggregates using a relatively uniform interface.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for creating user-defined aggregates in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the methods of the present invention.

Figure 6:
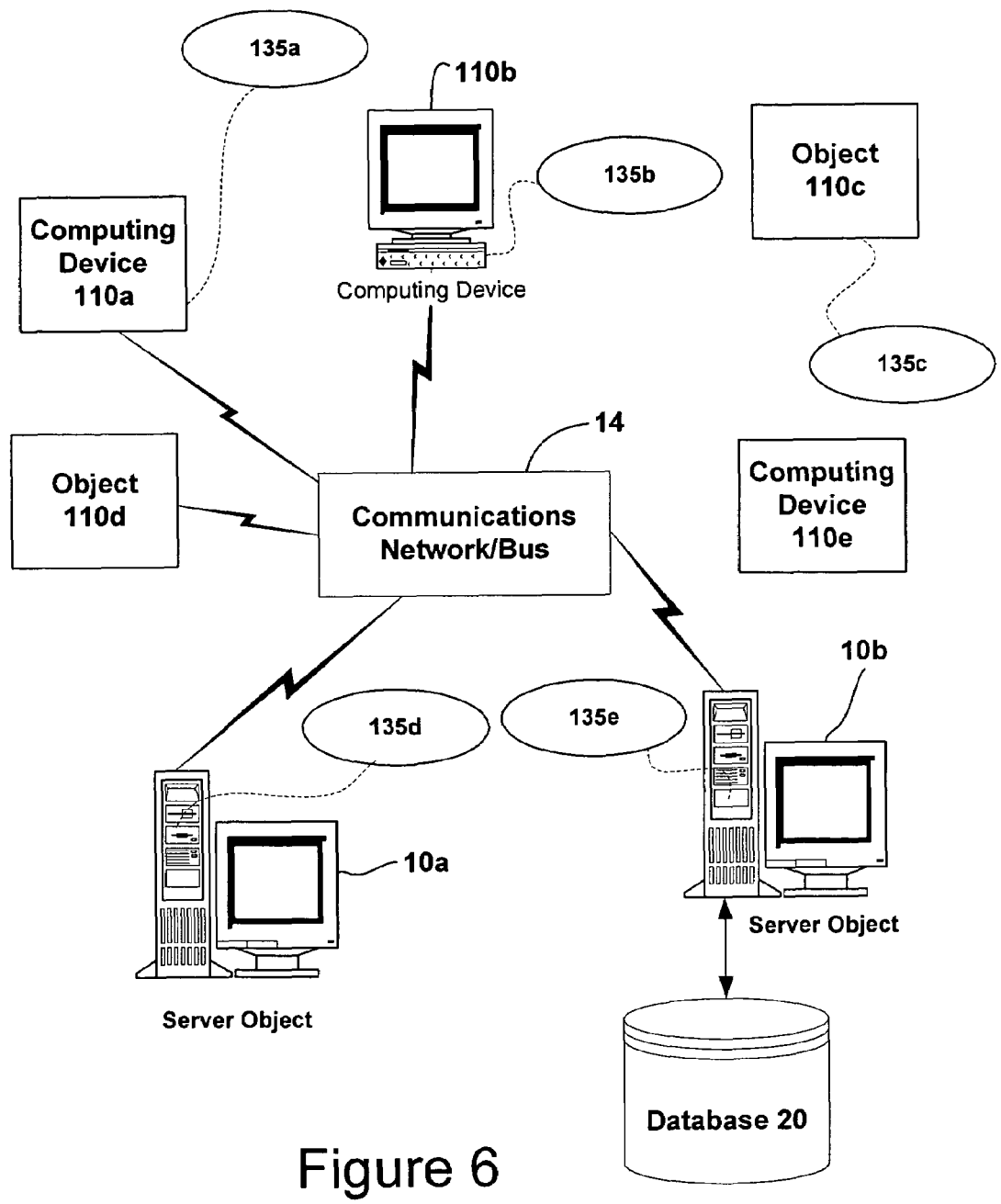
FIG. 6 is a block diagram representing an exemplary network environment having a variety of computing devices in which the present invention may be implemented.

FIG. 6 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 6, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the user-defined aggregate techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 6 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to create user-defined aggregates in a database store.

In a network environment in which the communications network/bus 14 is the Internet, for example, the servers 10a, 10b, etc. can be servers with which the clients 110a, 110b, 10c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 7:
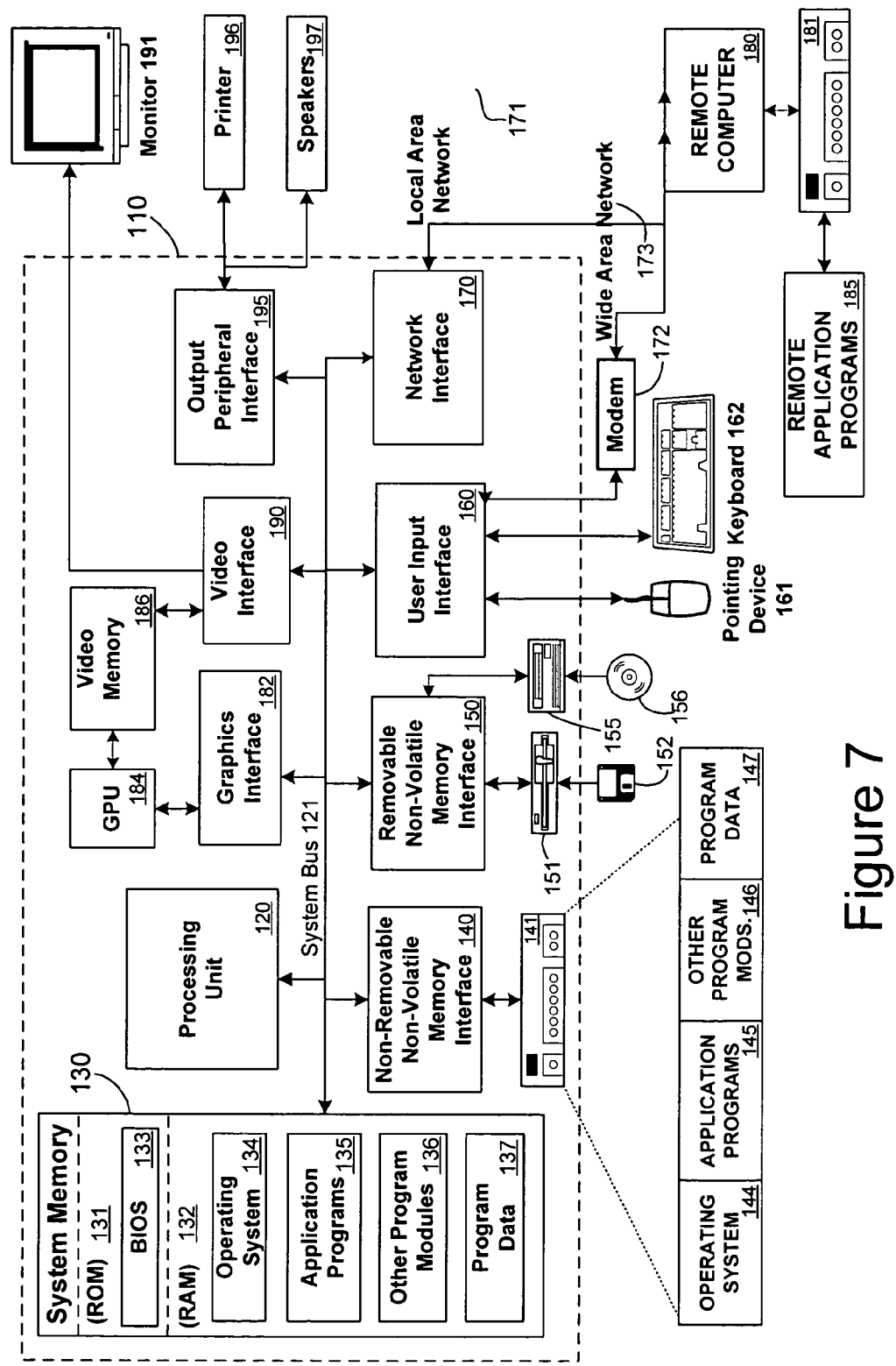
FIG. 7 is a block diagram representing an exemplary computing device in which the present invention may be implemented.

FIG. 7 and the following discussion are intended to provide a brief general description of a suitable computing device in connection with which the invention may be implemented. For example, any of the client and server computers or devices illustrated in FIG. 6 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 7 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7 provide storage of computer readable instructions, data structures, program modules and other data for the computer 110. In FIG. 7, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

As the foregoing illustrates, the present invention is directed to a system and methods for creating user-defined aggregates in a database management system. It is understood that changes may be made to the embodiments described above without departing from the broad inventive concepts thereof. For example, while an embodiment of the present invention has been described above as being implemented in Microsoft's SQL SERVER database management system, it is understood that the present invention may be embodied in any database management system. Accordingly, it is understood that the present invention is not limited to the particular embodiments disclosed, but is intended to cover all modifications that are within the spirit and scope of the invention as defined by the appended claims.

"Microsoft" and "Windows" are registered trademarks of Microsoft Corporation, and ".NET," "Visual Basic," and "SQL Server" are trademarks of Microsoft Corporation.

What is claimed:

1. A method for allowing users to define new aggregates in a database system, comprising:
   receiving code that instantiates an object of a class defining the structure of a user-defined aggregate and methods that can be invoked on instances of the user-defined aggregate; and
   enforcing a contract against the class so that the code, when executed at runtime, satisfies requirements of the contract to ensure desired execution thereof, the contract requiring that the class comprise a first method that is invoked to initialize the computation of an instance of the user-defined aggregate, a second method that is invoked to accumulate a plurality of values to be aggregated, and a third method that is invoked to compute a final result of the instance of the user-defined aggregate, the contract further comprising a requirement that the class specify one of a plurality of different formats which describes how instances of the user-defined aggregate are to be persisted in a database store, wherein the plurality of different formats which describe how instances of the user-defined aggregate are to be persisted in the database store comprises:
   a first format in which an instance of the user-defined aggregate is automatically serialized in accordance with a native format of the database system; and
   a second format in which an instance of the user-defined aggregate is serialized in a manner defined by the class.

2. The method of claim 1, wherein the contract further comprises a requirement that the class comprise a fourth method that is invoked to merge an instance of the user-defined aggregate with another partial aggregation.

3. The method of claim 1, wherein the contract further comprises a requirement that the class comprise a public constructor having no arguments.

4. The method of claim 1, further comprising storing metadata about the user-defined aggregate for subsequent use by the database system in creating instances of the user-defined aggregate.

5. The method of claim 1, wherein the plurality of different formats which describe how instances of the user-defined aggregate are to be persisted in the database store further comprises a third format in which an instance of the user-defined aggregate is serialized in accordance with a method provided by a managed code programming model.

6. The method of claim 1, wherein the code that implements the class comprises managed code.

7. The method of claim 1, further comprising:
   receiving a query that requires evaluation of the user-defined aggregate over a group of elements;
   instantiating an instance of the class that defines the structure of the user-defined aggregate;
   invoking said first method to initializing the instance of the user-defined aggregate;
   for each element of the group, invoking said second method on the instance of the user-defined aggregate to accumulate each element; and
   invoking said fourth method to return a value of the user-defined aggregate.

8. The method of claim 7, further comprising deserializing the instance of the user-defined aggregate prior to invoking said second method for an element of the group and then serializing the instance after invoking said second method for the element.

9. The method of claim 7, further comprising:
   deserializing the instance of the user-defined aggregate prior to invoking said second method for a first element of the group;
   caching the deserialized instance of the user-defined aggregate;
   for each element of the group, invoking said second method on the cached instance of the user-defined type; and, thereafter,
   serializing the cached instance of the user-defined type.

10. The method of claim 1, wherein the class defining the user-defined aggregate is annotated to specify one of:
    an attribute that indicates whether the user-defined aggregate is invariant to duplicates;
    an attribute that indicates whether the user-defined aggregate is invariant to NULL values;
    an attribute that indicates whether the user-defined aggregate is invariant to order; and
    an attribute that indicates whether the user-defined aggregate returns NULL if the group on which the user-defined aggregate is to be computed is empty.

11. The method of claim 10, further comprising determining a method of computation of an instance of the user-defined aggregate based at least in part upon a value of said one of said attributes.

12. A database system that allows users to define new aggregates, comprising:
    a processing unit to perform the following:
    a runtime that provides code execution within the database system; and
    a database server that receives code that instantiates an object of a class defining the structure of a user-defined aggregate and methods that can be invoked on instances of the user-defined aggregate and that enforces a contract against the class so that the code, when executed at runtime, satisfies requirements of the contract to ensure desired execution thereof, the contract requiring that the class comprise a first method that is invoked to initialize the computation of an instance of the user-defined aggregate, a second method that is invoked to accumulate a plurality of values to be aggregated, and a third method that is invoked to compute a final result of the instance of the user-defined aggregate, the contract further comprising a requirement that the class specify one of a plurality of different formats which describes how instances of the user-defined aggregate are to be persisted in a database store, wherein the plurality of different formats which describe how instances of the user-defined aggregate are to be persisted in the database store comprises:

a first format in which an instance of the user-defined aggregate is automatically serialized in accordance with a native format of the database system; and a second format in which an instance of the user-defined aggregate is serialized in a manner defined by the class.

13. The system of claim 12, wherein the contract further comprises a requirement that the class comprise a fourth method that is invoked to merge an instance of the user-defined aggregate with another partial aggregation.

14. The system of claim 12, wherein the contract further comprises a requirement that the class comprise a public constructor having no arguments.

15. The system of claim 12, wherein the database server stores metadata about the user-defined aggregate for subsequent use by the database system in creating instances of the user-defined aggregate.

16. The system of claim 12, wherein the plurality of different formats which describe how instances of the user-defined aggregate are to be persisted in the database store further comprises a third format in which an instance of the user-defined aggregate is serialized in accordance with a method provided by a managed code programming model.

17. The system of claim 12, wherein the code that implements the class comprises managed code.

18. The system of claim 12, wherein the database server (i) receives a query that requires evaluation of the user-defined aggregate over a group of elements; (ii) instantiates an instance of the class that defines the user-defined aggregate; (iii) invoking said first method to initializing the instance of the user-defined aggregate; (iv) for each element of the group, invokes said second method on the instance of the user-defined aggregate to accumulate each element; and (iv) invokes said fourth method to return a value of the user-defined aggregate.

19. The system of claim 18, wherein the database server deserializes the instance of the user-defined aggregate prior to invoking said second method for an element of the group and then serializes the instance after invoking said second method for the element.

20. The system of claim 18, wherein the database server (i) deserializes the instance of the user-defined aggregate prior to invoking said second method for a first element of the group; (ii) caches the deserialized instance of the user-defined aggregate; (iii) for each element of the group, invokes said second method on the cached instance of the user-defined type; and (iv) thereafter, serializes the cached instance of the user-defined type.

21. The system of claim 12, wherein the class defining the user-defined aggregate is annotated to specify one of:

an attribute that indicates whether the user-defined aggregate is invariant to duplicates;

an attribute that indicates whether the user-defined aggregate is invariant to NULL values;

an attribute that indicates whether the user-defined aggregate is invariant to order; and an attribute that indicates whether the user-defined aggregate returns NULL if the group on which the user-defined aggregate is to be computed is empty.

22. The system of claim 21, further comprising a query processor that determines a method of computation of an instance of the user-defined aggregate based at least in part upon a value of said one of said attributes.

23. A computer storage medium having program code stored thereon for allowing users to define new aggregates in a database system, the program code, when executed by a computer, causing the computer to perform the method recited in claim 1.

* * * * *